United States Patent
Coleman, Jr. et al.

(10) Patent No.: US 6,891,497 B2
(45) Date of Patent: May 10, 2005

(54) CHIRP-BASED METHOD AND APPARATUS FOR PERFORMING PHASE CALIBRATION ACROSS PHASED ARRAY ANTENNA

(75) Inventors: John Roger Coleman, Jr., Palm Bay, FL (US); Travis Sean Mashburn, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 164 days.

(21) Appl. No.: 10/603,843

(22) Filed: Jun. 25, 2003

(65) Prior Publication Data

US 2005/0012659 A1 Jan. 20, 2005

(51) Int. Cl.[7] .............................................. G01S 7/40
(52) U.S. Cl. .................. 342/174; 342/25 R; 342/25 A; 342/118; 342/128; 342/131; 342/132; 342/165; 342/173; 342/195; 342/196; 342/352; 342/368; 342/371; 342/375
(58) Field of Search .................. 343/700 MS, 703, 343/705–708; 342/25 R–26 D, 118, 128–133, 165–175, 192–197, 368–384, 352–356

(56) References Cited

U.S. PATENT DOCUMENTS

| | | | | |
|---|---|---|---|---|
| 4,488,155 A | * | 12/1984 | Wu .............................. | 342/376 |
| 4,821,037 A | * | 4/1989 | Miller et al. ................. | 342/383 |
| 4,926,186 A | * | 5/1990 | Kelly et al. .................. | 342/360 |
| 5,248,982 A | * | 9/1993 | Reinhardt et al. ........... | 342/375 |
| 5,412,414 A | * | 5/1995 | Ast et al. ..................... | 342/174 |
| 5,455,592 A | * | 10/1995 | Huddle ......................... | 342/174 |
| 5,530,449 A | * | 6/1996 | Wachs et al. ................ | 342/174 |
| 5,543,801 A | * | 8/1996 | Shawyer ...................... | 342/174 |
| 5,572,219 A | * | 11/1996 | Silverstein et al. .......... | 342/375 |
| 5,677,696 A | * | 10/1997 | Silverstein et al. .......... | 342/174 |
| 5,680,141 A | * | 10/1997 | Didomenico et al. ....... | 342/372 |
| 5,861,843 A | * | 1/1999 | Sorace et al. ................ | 342/372 |
| 5,929,809 A | * | 7/1999 | Erlick et al. ................. | 342/372 |
| 5,940,032 A | * | 8/1999 | Passmann et al. ........... | 342/372 |
| 6,124,824 A | * | 9/2000 | Xu et al. ...................... | 342/174 |
| 6,127,966 A | * | 10/2000 | Erhage ......................... | 342/174 |
| 6,137,442 A | * | 10/2000 | Roman et al. ............... | 342/375 |
| 6,157,343 A | * | 12/2000 | Andersson et al. .......... | 342/371 |
| 6,163,296 A | * | 12/2000 | Lier et al. .................... | 342/174 |
| 6,208,287 B1 | * | 3/2001 | Sikina et al. ................. | 342/174 |
| 6,295,027 B1 | * | 9/2001 | Wixforth et al. ............. | 342/368 |
| 6,448,939 B2 | * | 9/2002 | Maruta ......................... | 342/380 |
| 6,480,153 B1 | * | 11/2002 | Jung et al. .................... | 342/368 |
| 6,489,923 B1 | | 12/2002 | Bevan et al. ................. | 342/378 |
| 6,693,588 B1 | * | 2/2004 | Schlee .......................... | 342/368 |
| 6,720,919 B1 | * | 4/2004 | Sinsky et al. ................ | 342/368 |

* cited by examiner

*Primary Examiner*—Bernarr E. Gregory
(74) *Attorney, Agent, or Firm*—Allen, Dyer, Doppelt, Milbrath & Gilchrist, P.A.

(57) ABSTRACT

A chirp-based method and apparatus measures phase variation through a reference frequency transport cable for a phased array antenna. A chirp is injected into the a signal transport path from a remote transmit/receive portion of the antenna, so that the chirp is conveyed over the signal path, reflected from an upstream bandpass filter at a local transmit/receive portion of the antenna, and returned to a remote transmit portion of the antenna. Energy in the returned chirp is extracted by a downstream bandpass filter and correlated in a delay lock loop with energy in an auxiliary chirp signal, that is delayed relative to the injected chirp. The delay of the auxiliary chirp is adjusted to maximize the correlation output and provide an indication of the delay through the signal path.

13 Claims, 1 Drawing Sheet

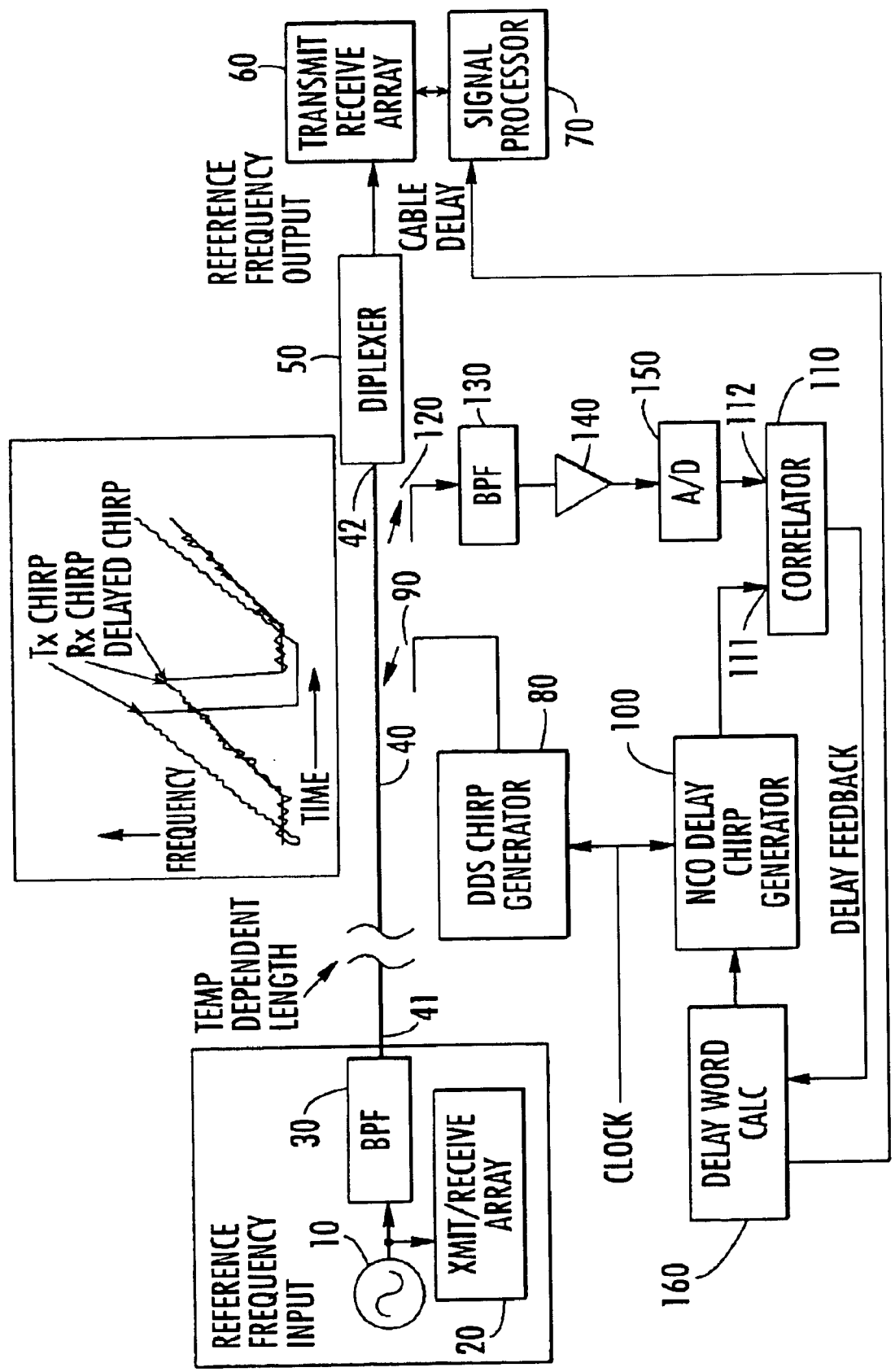

US 6,891,497 B2

CHIRP-BASED METHOD AND APPARATUS FOR PERFORMING PHASE CALIBRATION ACROSS PHASED ARRAY ANTENNA

FIELD OF THE INVENTION

The present invention relates in general to communication systems and subsystems therefor, and is particularly directed to a new and improved, chirp-based arrangement for deriving a very accurate measure of phase variation through a reference frequency transport cable of a relatively physically large phased array antenna architecture, such as a spaceborne synthetic aperture radar system.

BACKGROUND OF THE INVENTION

Relatively large phased array antenna architectures, such as but not limited to spaceborne, chirped synthetic aperture radar systems, typically contain a multiplicity of transmitters and receivers distributed across respective spaced apart arrays. In such a system, a common reference frequency is customarily supplied to all transmit and receive element groups of the array. As such, there is the issue of how to take into account phase shift associated with variations in the substantial length of signal transport cable that links a reference frequency source, used at one transmit/receive location in the array, with the a remote transmit/receive portion of the array.

Because terrestrial open loop calibration of the system suffers from the inability to take into account variation in temperature along the transport cable due to changes in sun angle, and variations in obscuration by components of the antenna support platform in the antenna's space-deployed condition, it has been proposed to perform temperature measurements at a number of locations along the cable and provide phase compensation based upon the measured values. A drawback of this approach stems from the fact that there are non-linearities within the cable, so that over different temperatures it is necessary to employ a larger number of values in the calibration table. In addition, because this scheme employs multiple measurement points along the cable, there are associated variations in loading which, in turn, introduce separate amounts of phase shift to the reference frequency signal.

SUMMARY OF THE INVENTION

In accordance with the present invention, the above discussed transport cable-based phase variation problem is effectively obviated by injecting a direct digital synthesized RF chirp signal into the signal transport path from the receive end of the path. The injected RF chirp signal is transmitted over the signal transport path, and then reflected from an upstream bandpass filter (tuned to the RF frequency reference signal) at the reference source end of the antenna, so as to return to the remote portion of the antenna where it was originally injected. Via a downstream bandpass filter (tuned to the passband of the chirp), a reflected RF chirp signal receiver at the receive remote end of the path extracts energy in the reflected RF chirp return signal.

The output of the RF chirp signal receiver is coupled to a correlator of a delay locked loop, which correlates energy of the returned RF chirp signal with energy in an auxiliary RF chirp signal, the generation of which is delayed with respect to that of the RF chirp signal injected into the signal transport path. The delay of the auxiliary RF chirp signal is adjusted to maximize the output of the correlator and provide an output representative of phase delay through the signal transport path.

BRIEF DESCRIPTION OF THE DRAWINGS

The single FIGURE diagrammatically illustrates an embodiment of the phase calibration architecture of the present invention.

DETAILED DESCRIPTION

Before describing in detail the chirp-based cable calibration arrangement of the present invention, it should be observed that the invention resides primarily in a modular arrangement of conventional communication circuits and components and an attendant supervisory controller therefor, that controls the operations of such circuits and components. In a practical implementation that facilitates their being packaged in a hardware-efficient equipment configuration, this modular arrangement may be implemented by means of an application specific integrated circuit (ASIC) chip set.

Consequently, the architecture of such arrangement of circuits and components has been illustrated in the drawings by a readily understandable block diagram, which shows only those specific details that are pertinent to the present invention, so as not to obscure the disclosure with details which will be readily apparent to those skilled in the art having the benefit of the description herein. Thus, the block diagram illustration is primarily intended to show the major components of the invention in a convenient functional grouping, whereby the present invention may be more readily understood.

Attention is now directed to the single FIGURE, wherein an embodiment of the chirp-based cable calibration arrangement of the present invention is diagrammatically illustrated. As shown therein, a reference frequency signal generator 10, such as a very stable oscillator that is co-located with one transmit/receive portion of the array 20, is coupled through a bandpass filter 30, which is centered on the output frequency of the reference frequency signal generator, to a first end 41 of a length of cable 40, phase variations through which, such as associated with temperature variations along the cable, are to be compensated. The far or remote end 42 of the cable 40 is coupled through a diplexer 50 to a transmit/receive portion of the antenna array 60 and associated receive array processing circuitry 70.

As pointed out above, cable 40 can be expected to be subjected to temperature variations (and accompanying variations in cable length/transport delay) along its length due to changes in temperature, such as those associated with changes in sun angle, and obscuration by components of the antenna support platform. The present invention solves this problem and provides an accurate measure of cable transport delay, by injecting, from the downstream or receive end 42 of the cable, a chirp signal that propagates up the cable, is reflected from the bandpass filter 30 and returns back down the cable to a reflected signal processor, that determines the cable delay.

To this end, the invention employs direct digital synthesizer 80 that generates a phase continuous chirp signal that is coupled into the cable by means of a coupler 90 at the downstream end of the cable. Operating in parallel with and driven by the same clock as DDS chirp generator 80 is a numerically controlled chirp generator 100, the output of which is coupled to a first input of 111 of a digital correlator 110. A second input 112 of correlator 110 is coupled to receive a digitized version of the reflected chirp signal that has been returned to the downstream/remote end of the cable. For this purpose, a coupler 120 is installed adjacent the downstream/receive end of the cable. The output of the coupler is coupled through a bandpass filter 130 and associated gain stage 140 to an analog-to-digital (A/D) converter 150 to the second input 112 of the correlator 110. The output of the correlator 110 is coupled to a delay calculation unit 160, which outputs a digital delay word value in accordance with the degree of correlation produced by correlator 110. The delay word value, in turn, is coupled to the chirp generator 100, and is used to adjust the amount of delay in the numerically controlled chirp signal produced by generator 100 to maximize the output of correlator 110. When this happens the value of the delay word produced by delay calculation unit 160 represents the total (upstream and return) delay through the cable. Within the unit 160 this value is divided by two and supplied over an output link 161 as a digital value representative of the length and associated transport delay through the cable to the receive array processing circuitry 70. The receive array processing circuitry is now able to adjust the phase of the reference frequency to take into account the length of (delay through) the cable 40.

It should be noted that the rate of change of cable length is considerably slow relative to the processing time associated with the operation of the invention. As pointed out above, in a spaceborne environment, changes in cable length due to temperature are ambient effects, such as sun angle and obscuration by components of the antenna support platform. Such changes are very slow relative to the high signal transport and processing speeds associated with the generation of the chirp and correlation processing of the chirp return, which may be in the pico to microsecond range.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. For use with an electrical apparatus employing a signal transport path having a first node coupled with a reference frequency signal source that is operative to generate a reference frequency signal that propagates along said signal transport path to a second node, said signal transport path imparting a variable delay of said reference frequency signal employed by said apparatus to operate electrical devices at said nodes, as a result of temperature variation along said signal transport path, a method of providing a measure of delay through said signal transport path between said first node and said second node, said method comprising the steps of:

(a) injecting a chirp signal into said signal transport path from said second node of said signal transport path, so that said chirp signal is transmitted over said signal transport path, is reflected from said first node and returned to said second node of said apparatus;

(b) receiving said reflected chirp signal at said second node of said apparatus;

(c) correlating energy contained in said reflected chirp signal received in step (b) with energy in an auxiliary chirp signal, delayed with respect to that of the chirp signal injected into said signal transport path in step (a); and (d) adjusting said auxiliary chirp signal to maximize the result of correlating in step (c) and thereby provide an output representative of delay through said signal transport path.

2. The method according to claim 1, further including a reference frequency bandpass filter coupled with said first node and being operative to pass said reference frequency signal and reflect said chirp signal, and wherein step (a) comprises injecting said chirp signal into said signal transport path from said second node, so that said chirp signal is transmitted over said signal transport path and is reflected from said bandpass filter, and step (b) comprises receiving said reflected RF chirp signal via a reference bandpass filter at said second node.

3. The method according to claim 2, wherein step (a) comprises generating said chirp signal by means of a direct digital synthesizer into said signal transport path from said second node, so that said digitally synthesized chirp signal is transmitted over said signal transport path and is reflected from said transmit bandpass filter, and wherein said auxiliary chirp signal of step (c) is generated by means of an auxiliary chirp signal generator that is operative to generate said auxiliary chirp delayed relative to said injected chirp signal of step (a).

4. The method according to claim 3, wherein step (d) comprises adjusting the amount of delay by way of which said auxiliary chirp signal is delayed relative the chirp signal generated in step (a) to maximize the result of correlating in step (c) and thereby provide an output representative of delay through said signal transport path.

5. The method according to claim 1, wherein said electrical apparatus comprises a phased array antenna, and said first node comprises one transmit/receive antenna array and said second node comprises a second transmit/receive antenna array.

6. An arrangement for providing a measure of phase delay through a signal transport path for a reference frequency signal that is conveyed thereover between first and second nodes of an electrical apparatus, comprising:

a chirp signal generator which is operative to inject an upstream-directed chirp signal into said signal transport path from said second node of said apparatus, so that said chirp signal is transmitted over said signal transport path, is reflected from said first node, and returns to said second node;

a reflected chirp signal receiver coupled with said second node, and being operative to extract energy in said chirp signal that has reflected from said first node, and returned to said second node;

a correlator that is operative to correlate energy contained in said reflected chirp signal with energy in an auxiliary chirp signal, delayed with respect to that of the RF chirp signal injected into said signal transport path; and an auxiliary chirp signal adjustment unit, which is operative to adjust said auxiliary chirp signal to maximize the output of said correlator and thereby provide an output representative of delay through said signal transport path.

7. The arrangement according to claim 6, wherein said first node includes an upstream bandpass filter from which said injected chirp signal is reflected and returned to said second node, and wherein said second node includes a downstream bandpass filter operative to pass said injected chirp signal as reflected by said upstream bandpass filter and returned to said second node.

8. The arrangement according to claim 7, wherein said chirp signal generator comprises a direct digital synthesizer, and wherein said auxiliary chirp signal adjustment unit comprises an auxiliary chirp signal generator operative to generate said auxiliary chirp delayed relative to said injected chirp signal generated by said direct digital synthesizer.

9. The arrangement according to claim 7, wherein said apparatus comprises a phased array antenna, and wherein said first node is coupled with one transmit/receive antenna array and said second node is coupled with a second transmit/receive antenna array.

10. For use with a phased array antenna having a signal transport path between transmit/receive array portions of said antenna, said signal transport path being subject to a variable delay therethrough, of a reference frequency signal employed by said antenna to operate said transmit/receive array portions thereof, as a result of temperature variations along said signal transport path, a method of providing a measure of said variable delay through said signal transport path comprising the steps of:
 (a) at said remote portion of said antenna, injecting a chirp signal into said signal transport path so that said chirp signal is transmitted over said signal transport path and is reflected from said local transmit/receive portion of said antenna;
 (b) extracting said reflected chirp signal at said receive portion of said antenna and correlating energy contained in said reflected chirp signal with energy in an auxiliary chirp signal that is delayed with respect to that of the chirp signal injected into said signal transport path in step (a);
 (c) adjusting said auxiliary chirp signal to maximize its correlation with said reflected chirp signal and producing an output representative of phase delay of said reference frequency signal through said signal transport path.

11. The method according to claim 10, wherein said transmit/receive portion of said antenna contains a reference bandpass filter that is operative to pass said reference frequency signal but reflect said chirp signal, and wherein step (b) comprises receiving said reflected chirp signal via a reference frequency bandpass filter at said receive portion of said antenna.

12. The method according to claim 11, wherein step (a) comprises generating said chirp signal by means of a direct digital synthesizer into said signal transport path from said receive portion of said antenna, so that said digitally synthesized chirp signal is transmitted over said signal transport path and is reflected from said reference frequency bandpass filter, and wherein said auxiliary chirp signal is generated by means of an auxiliary chirp signal generator that is operative to generate said auxiliary chirp delayed relative to said injected chirp signal of step (a).

13. The method according to claim 12, wherein step (c) comprises adjusting the amount of delay, by way of which said auxiliary chirp signal is delayed relative to the chirp signal generated in step (a), to maximize the result of correlating in step (b) and thereby provide an output representative of delay of said reference frequency signal through said signal transport path.

* * * * *